Patented July 20, 1937

UNITED STATES PATENT OFFICE 2,087,706

AZO DYES AND THEIR PRODUCTION

Wilfred Archibald Sexton, Blackley, Manchester, England, assignor to Imperial Chemical Industries Limited, London, England No Drawing. Application April 10, 1934, Serial No. 719,851. In Great Britain February 13, 1933

3 Claims. (Cl. 260—76)

This invention relates to the manufacture and application of new arylamides of 2,3-hydroxynaphthoic acids.

According to the invention I manufacture, by processes hereinafter described, new arylamides of 2,3-hydroxynaphthoic acid of the formula

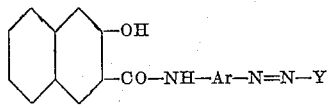

(the significance of Ar and Y being as explained below). The new arylamides have good affinity for cotton and in accordance with a further feature of the invention they may be coupled either in substance or on the fibre with suitable diazo compounds.

In the above formula Ar represents an aromatic divalent radical, e. g. —$C_6H_4$—, —$C_6H_4 \cdot C_6H_4$—, —$C_6H_4 \cdot S \cdot C_6H_4$—, —$C_6H_4 \cdot CO \cdot NH \cdot C_6H_4$—, or

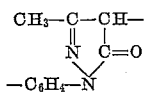

and Y represents the radical of an active methylene component.

Coupling components of the active methylene type are those which have a —$CH_2$—CO— group and are capable of combining by reason of the presence of the said group with a diazo component to produce an azo compound. Examples of such components are the radicals of an arylmethylpyrazolone and aceto-aceticarylamides, and a benzoyl-aceticarylamide. Examples of other coupling components are methylketol and 2,4 dihydroxy quinoline.

The new arylamides may be made, according to the invention, either by condensing 2,3-hydroxynaphthoic acid or its halide with an aminoazo compound of the formula, $NH_2 \cdot Ar \cdot N=N \cdot Y$ (Ar and Y having the above significance); or by coupling a diazotized 2,3-hydroxynaphthoic aminoarylamide with the coupling component of which Y is the radical. The aminoazo compound, $NH_2 \cdot Ar \cdot N=N \cdot Y$, is obtainable by coupling the monodiazotized diamine $NH_2 \cdot Ar \cdot NH_2$ (where that diamine is capable of monodiazotization), or the diazocompound of the nitro- or acylamino-arylamine, $NO_2 \cdot Ar \cdot NH_2$ or $AcNH \cdot Ar \cdot NH_2$ (Ac representing an acyl group) with the coupling component of which Y is the radical, and where necessary reducing the nitro group or hydrolyzing the acylamino group. Where Y is an aryl radical, such as $ClC_6H_4$—, the aminoazo compound, $NH_2 \cdot Ar \cdot N=N \cdot Y$, may be prepared by diazotizing the corresponding arylamine, Y—$NH_2$, and coupling it with the amine $NH_2$—Ar.

Valuable new dyes are obtained giving uncommon shades especially browns, greens, and blacks of good fastness properties, for instance to soaping.

The following examples illustrate, but do not limit the invention, the parts being by weight.

Example 1.—73.6 parts of benzidine are monodiazotized according to the method described by Taubner, Ber., 1894, 27, 2627. 70.8 parts of acetoacetic anilide are dissolved in a mixture of 1000 parts of water and 100 parts of 33% caustic soda. Acetic acid is added until the solution is no longer alkaline to brilliant yellow paper. This precipitates the acetoacetic anilide as a fine suspension. The diazo solution is run in during half an hour and the mixture stirred until coupling is complete. The yellow compound is then filtered off, washed and dried. It is believed to have the structure

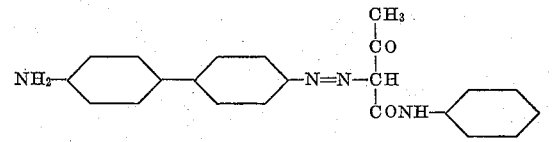

29 parts of the above new compound together with 13.2 parts of 2,3-hydroxynaphthoic acid are suspended in 250 parts of toluene. 4.2 parts of phosphorus trichloride are added at 60° C. with agitation. The mixture is then boiled gently under reflux for 16 hours and the insoluble product filtered off. It is purified by extraction with hot dichlorobenzene. It is a yellow substance insoluble in common organic solvents. It chars before melting. It is soluble in alkalies.

Example 2.—2 parts of the above arylamide are ground with 10 parts of Turkey red oil and 15 parts of caustic soda (70° Tw.). 20 parts of methylated spirit are added and the whole thoroughly mixed and poured into 200 parts of water at 70° C. The dispersion is then diluted with a further 300 parts of water.

25 parts of cotton are steeped in the diluted dispersion for half an hour at 25–30° C. lifted, pressed to remove surplus liquor and then added to a neutral bath of diazotized 4-methoxy-4'-aminodiphenylamine containing 3 parts of magnesium sulphate crystals and 1 part of diazotized base per litre of liquor.

Example 3.—10.8 parts of p-phenylenediamine are dissolved in 21 parts of 36% hydrochloric acid and 200 parts of water. The solution is cooled to 0° C. and 7 parts of sodium nitrite dissolved in 20 parts of water are then added during 15 minutes at a temperature no greater than 0° C. Diazotization is completed by stirring for 5 minutes.

17.7 parts of aceto-acetic anilide are dissolved in 200 parts of water and 12 parts of caustic liquor, 70° Tw., 8 parts of sodium carbonate are added and the diazo solution run in during half an hour with agitation. Coupling is almost instantaneous and the yellow product is filtered, washed with water and dried. When recrystallized from benzene it melts at 195–197° C.

10 parts of the above product together with 7.65 parts of 2,3-hydroxynaphthoyl chloride are added to 100 parts of dry toluene and the mixture boiled gently under reflux until evolution of hydrogen chloride ceases. The hot mixture is filtered and the insoluble product washed with 100 parts of boiling toluene. The final 2.3-hydroxy-naphthoic arylamide, a yellow powder, melts at 285–290°.

*Example 4.*—2 parts of the above 2,3-hydroxy-naphthoic arylamide are ground with 15 parts of Turkey red oil and 10 parts of caustic soda 70° Tw. 20 parts of methylated spirit are added, followed by 5 parts of 30% formaldehyde solution. The whole is thoroughly mixed and poured into 700 parts of water at 50°.

25 parts of cotton are steeped in the solution for half an hour at 35–40°, pressed to remove surplus liquor and then added to a neutral bath of a diazotized amine containing 0.3% magnesium sulphate crystals, 5% sodium chloride and 0.1% of diazotized base. Suitable bases are 4-methoxy-4'-aminodiphenylamine and 4-benzoylamino-2,5-dimethoxyaniline, both of which give green shades.

*Example 5.*—10.8 parts of p-phenylenediamine are monodiazotized as in Example 3 and the diazo solution run during half an hour into a solution of 17.4 parts of 1-phenyl-3-methyl-5-pyrazolone in 12 parts of caustic liquor (70° Tw.), 10 parts of sodium carbonate and 500 parts of water. Coupling is practically instantaneous and the red product is filtered, washed and dried. It is soluble in boiling dilute hydrochloric acid giving a yellow solution.

29.3 parts of the red compound together with 18.8 parts of 2,3-hydroxynaphthoic acid are suspended in 350 parts of toluene at 60° C. and 6 parts of phosphorus trichloride are then added during half an hour. The temperature is raised and the mixture is boiled gently under reflux for 16 hours. The insoluble brown product is filtered from the hot toluene, washed first with hot water, then with a little 5% sodium carbonate solution and finally again with water. It melts at 274–276° with decomposition.

*Example 6.*—4 parts of the arylamide prepared as in Example 5 are mixed with 15 parts of caustic liquor 70° Tw., 15 parts of Turkey red oil and 20 parts of methylated spirit. The solution is added to 1000 parts of water at 40°

25 parts of cotton are steeped in the clear brown solution for half an hour at 35°–40° C., pressed to remove surplus liquor and then added to a neutral bath containing 1 part per 1000 of a diazotized amine, 3 parts per 1000 of magnesium sulphate and 50 parts per 1000 of salt. The following illustrate the types of shade obtained.

| Base | Shade |
|---|---|
| o-Nitroaniline | Golden brown. |
| 2,5-dichloroaniline | Do. |
| a-Aminoanthraquinone | Reddish brown. |
| 4-nitro-o-anisidine | Do. |
| 5-nitro-o-anisidine | Do. |
| 4-amino-4'-methoxydiphenylamine | Greenish black. |
| 4-benzoylamino-2,5-dimethoxyaniline | Deep black. |

By using only half the concentration of arylamide given above, development with 4-benzoylamino-2,5-dialkoxyanilines gives chocolate brown shades.

*Example 7.*—11 parts of m-chloroaniline hydrochloride are diazotized by suspension in 30 parts of 10% hydrochloric acid and 500 parts of water and addition of 4.6 parts of sodium nitrite.

15 parts of the hydrochloride of 1-m-aminophenyl-3-methyl-5-pyrazolone are dissolved in 15 parts of caustic soda 70° Tw., and 1000 parts of water, 3.6 parts of sodium carbonate are added and the diazotized m-chloroaniline is run in during half an hour. Coupling is instantaneous, giving a yellow pigment.

16.3 parts of this pigment and 9.9 parts of 2,3-hydroxy-naphthoic acid are suspended in 300 parts of dry toluene at 60°. 3 parts of phosphorus trichloride are added during half an hour. The temperature is raised and the mixture boiled under reflux for 16 hours. The insoluble arylamide is filtered, dried and washed with 5% sodium carbonate solution. It forms a yellow powder, M. P. 203–6°. It is believed to possess the structure

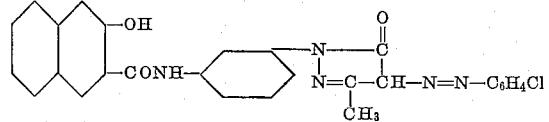

*Example 8.*—2 parts of the arylamide described in Example 7 are pasted with 6 parts of caustic soda, 70° Tw., 10 parts of Turkey red oil and 5 parts of methylated spirits. The whole is then dissolved in 500 parts of water.

25 parts of cotton are steeped in the clear solution for half an hour at 30°, pressed to remove surplus liquor and then added to a neutral bath containing 1 part per 1000 of a diazotized amine, 3 parts per 1000 of magnesium sulphate and 50 parts per 1000 of sodium chloride.

4 methoxy-4'-aminodiphenylamine and 4-benzoylamino-2,5-dimethoxyaniline both give green shades while dianisidine gives a deep bluish green.

*Example 9.*—If the 1-phenyl-3-methyl-5-pyrazolone in Example 5 is replaced by the chemically equivalent quantity of 1-(2',5'-dichlorophenyl)-3-methyl-5-pyrazolone there is obtained finally a brown arylamide which after recrystallization from dichlorobenzene has M. P. 278° C., (with decomposition). This new arylamide may be coupled with diazotized amino on the fibre as described in Example 6. With o-nitroaniline or 2,5-dichloroaniline to give orange-brown shades, or with 4-amino-4'-methoxydiphenylamine to give a bluish green shade, or with 4-benzoylamino-2,5-dialkoxyaniline to give a chocolate brown shade.

*Example 10.*—m-Aminoformanilide, which is prepared by reduction of m-nitroformanilide and which has M. P. 104–6 is diazotized by means of sodium nitrite and dilute hydrochloric acid in the usual way and the diazo solution run into an alkaline solution of 1-phenyl-3-methyl-5-pyrazolone, as described in Example 5. The insoluble yellow product is filtered off and warmed for half an hour at 50° C. with 36% hydrochloric acid. This causes fission of the formyl group, giving a brown product which crystallizes in reddish-brown leaflets (from xylene) M. P. 184° C. The substance has the structure

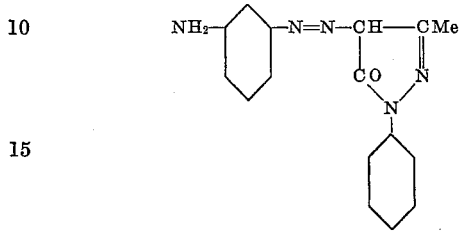

Condensation of this substance with 2,3-hydroxynaphthoic acid is effected as described in Example 5 giving a yellow substance M. P. 215–6° C.

This arylamide is coupled with diazotized amines on the fibre in the manner described in Example 6. 4-amino-4'-methoxydiphenylamine and 4,4'-diaminodiphenylamine give bluish-green shades and 4-benzoylamino-2,5-dialkoxyanilines give greys.

*Example 11.*—If the pyrazolone used in Example 10 be replaced by an equivalent amount of 1-(2',5'-dichlorophenyl)-3-methyl-5- pyrazolone there is obtained a final product of M. P. 227–30° C. This can be coupled with diazotized amines on the fibre to give similar shades to those obtained when starting from the pyrazolone of Example 10 are obtained.

*Example 12.*—If the 1 - m - aminophenyl - 3-methyl-5-pyrazolone of Example 7 be replaced by the para isomer there is obtained a yellow pigment M. P. 195–198° C. which when condensed with 2,3-hydroxynaphthoic acid (as described in the said example) gives a substance M. P. above 280° C.

When used in dyeing as described in Example 8, dark green shades are obtained with 4-amino-4'-methoxydiphenylamine and 4,4'-diaminodiphenylamine and black shades with dianisidine, and 4-benzoylamino-2,5-dialkoxyanilines.

*Example 13.*—If the m-chloroaniline of Example 7 is replaced by an equivalent quantity of m-nitroaniline there is obtained an arylamide M. P. 223–226° C. On using this in dyeing by the method described in Example 8, bluish-green shades are obtained with 4-amino-4'-methoxydiphenylamine and 4,4'-diaminodiphenylamine bluish blacks with dianisidine, 4-benzoylamino-2,5 - dialkoxyanilines and o-phenetole-azo-α-naphthylamine.

*Example 14.*—If the m-chloroaniline of Example 7 be replaced by 4-benzoylamino-2,5-dimethoxyaniline there is obtained an arylamide which when used in dyeing as described in Example 8 gives brown shades with such bases as dianisidine, 4-amino-4'-methoxydiphenylamine, 4,4'-diamino-diphenylamine, and 4-benzoylamino-2,5-dialkoxyanilines.

I claim:

1. The product substantially identical with that which is produced by coupling a diazotized primary arylamine to a component of the formula:

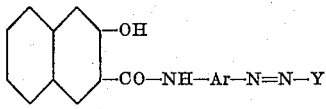

where Ar represents an aromatic divalent radical chosen from the group consisting of

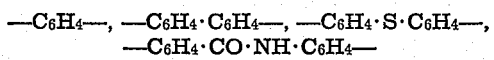

and

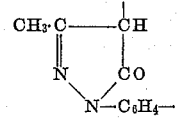

and Y is one of the group consisting of the radicals of arylmethylpyrazolone, aceto-aceticarylamide, benzoyl-aceticarylamide, 2,4-dihydroxyquinoline, and methylketol.

2. A colored product represented by the formula:

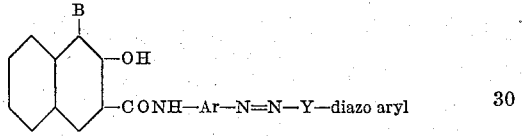

in which Ar is an aromatic divalent radical from the group consisting of

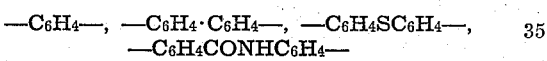

and

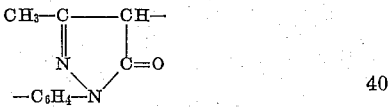

and Y is an active methylene component and B is one of a group consisting of hydrogen and the radical of a diazotized arylamine.

3. The process which comprises coupling a diazotized primary arylamine to a component of the formula:

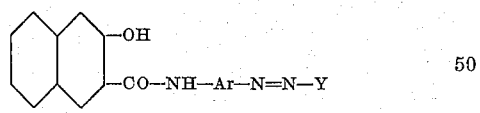

where Ar represents an aromatic divalent radical chosen from the group consisting of

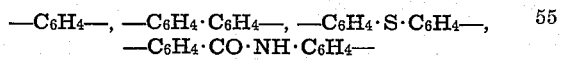

and

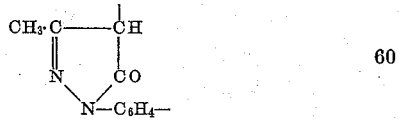

and Y is one of the group consisting of the radicals of arylmethylpyrazolone, aceto-aceticarylamide, benzoyl-aceticarylamide, 2,4-dihydroxyquinoline, and methylketol.

WILFRED ARCHIBALD SEXTON.